Aug. 21, 1923.

H. V. LOUGH

CONTOUR CALIPER

Filed Nov. 30, 1921

1,465,646

Inventor
Hector V. Lough
By his Attorney
Ernest Hopkinson

Patented Aug. 21, 1923.

1,465,646

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

CONTOUR CALIPER.

Application filed November 30, 1921. Serial No. 518,749.

*To all whom it may concern:*

Be it known that I, HECTOR V. LOUGH, a subject of the King of Great Britain, residing at Hartford, in the county of Hartford and State of Connecticut, have invented certain new and useful Contour Calipers, of which the following is a full, clear, and exact description.

This invention relates to a device for facilitating the graphic reproduction of the shape of a tire in cross-section.

In connection with the manufacture of tires, it is desirable to ascertain the shape of the tire in cross-section, particularly in connection with the production of those pneumatic types of casings made of laminations of cord fabric, the inclination or angle of whose cords governs the shape of the casing when inflated. This has been accomplished heretofore in various ways, as, for instance, by a plaster cast or by a cut-and-try method with cardboard. Obviously, these old practices are objectionable.

The present invention aims to provide a simple, reliable and accurate instrument or contour-caliper for obtaining the shape of a pneumatic casing of any size and make, and permitting it to be rapidly transferred to a drawing board, or other means of graphically recording the same.

Briefly, the invention consists of a caliper-like frame adapted to be encircled about a tire and carrying a plurality of fingers having laterally projecting chisel-points for pricking into paper the shape of the casing.

A preferred embodiment of the invention is illustrated in the accompanying drawings in which:—

Figure 1:
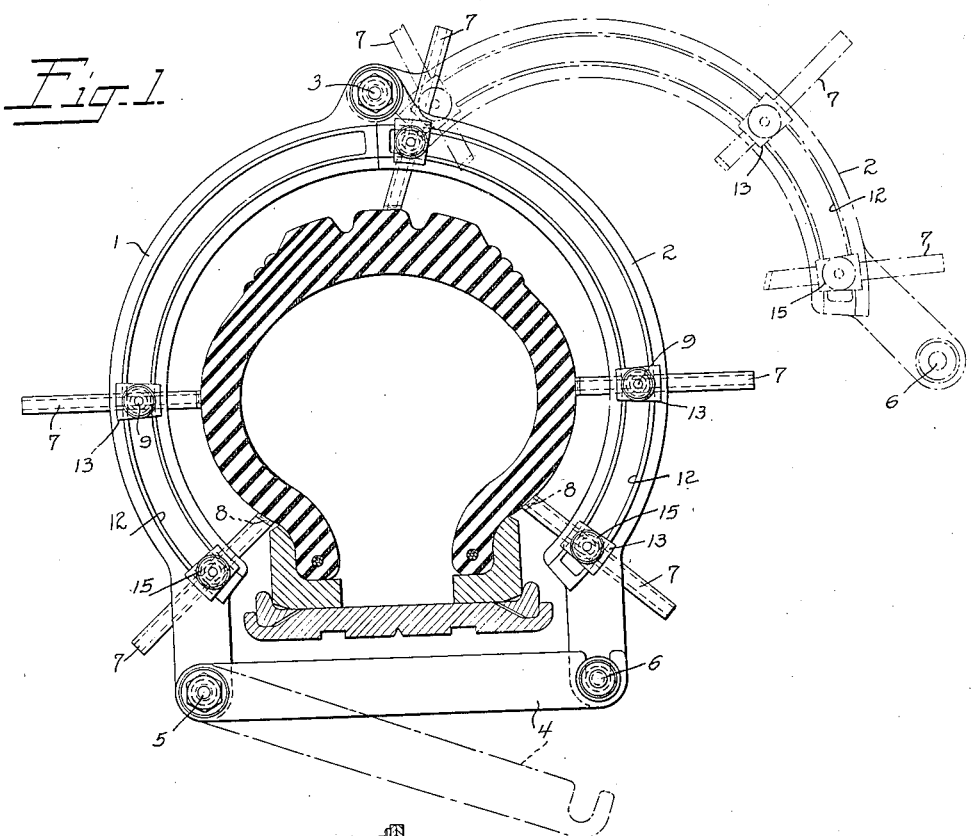
Figures 2, 4:
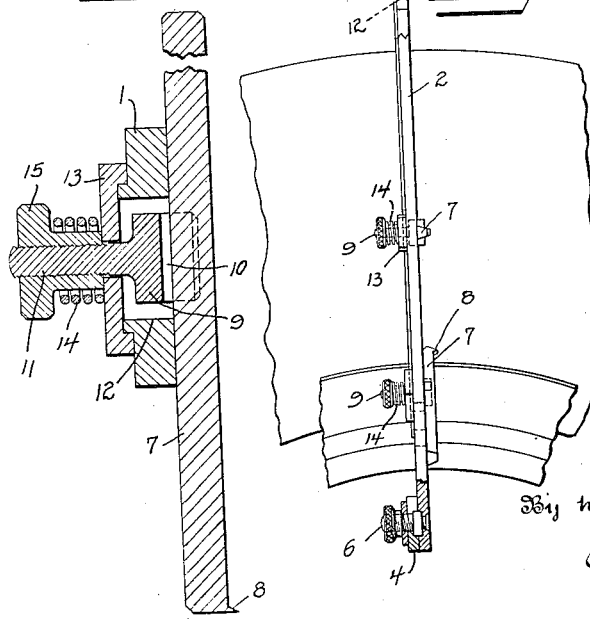
Figure 3:
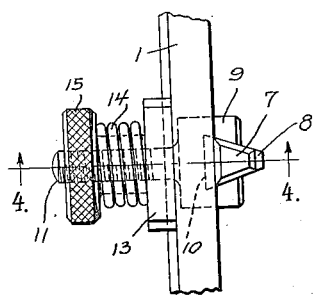

Fig. 1 is an elevation of the caliper in adjusted position about a tire, which is shown in cross-section mounted on an annular rim, Fig. 2 is a side elevation of the same, part of the frame appearing in section, Fig. 3 is an end elevation of one of the fingers shown supported on a part of the frame, and Fig. 4 is a section through a finger and its clamping device on the line 4—4, Fig. 3.

In the preferred embodiment of the invention illustrated in the drawings, the contour-caliper is shown comprising a pair of sections 1 and 2, which are pivoted together at one end as indicated at 3, and at their other ends are adapted to be secured together in any suitable manner as by a latch 4 loosely pinned at 5 to one section and quickly detachable from the other section as indicated at 6. The frame thus constituted may be readily positioned about a tire and its sections held in the fixed relation shown in Fig. 1, likewise, with facility, being removable and capable of accurate re-assemblage in the same fixed relation.

Each of the sections 1 and 2 is adapted to support a number (as many as fifteen) of fingers 7, trapezoidal in cross-section and having laterally projecting chisel-points 8. Each of the fingers 7 is adapted to be supported for adjustment both radially of the tire, i. e., endwise of the finger, and along its contour, i. e., each finger may be shifted bodily sidewise. To this end, a bolt 9, having a dove-tail slot 10 in its head and a threaded shank 11, is provided for each finger, the bolt being passed through a preferably arcuate slot 12 in a frame section, the shank of the bolt being passed loosely through a bridge-washer 13, constituting an abutment for a coil-spring 14 and nut 15 so as to permit each finger to be clamped or bound against the frame sections 1 and 2, either frictionally or positively.

The tool of the present invention with the fingers drawn back somewhat is first loosely assembled about a tire, the latch 4 being suitably moved and clamped for this purpose. Then the fingers, at this time held only frictionally against the frame sections 1 and 2 by the action of spring 14, are pushed endwise against the tire and when thus adjusted are clamped positively by turning the nut 15. The latch 4 is then loosened, the caliper removed and set up by reclamping the latch 4. The series of chisel-points 8 thus rigidly supported free and clear of the frame may then be pressed down upon a sheet of paper and the same pricked in correspondence with the shape of the tire by merely pressing upon the frame which, preferably, lies wholly to one side of the plane of the chisel-points and approximately in parallel relation therewith. With suitable curves, a line may then be readily passed through the several points that have been thus located upon paper so as to yield an accurate profile of the exterior of a tire casing.

It will be obvious that many changes may be made in the details of the invention and reference is therefore made to the appended claims for an understanding of its scope.

Having thus described my invention, what I claim and desire to protect by Letters Patent is:

1. A contour-caliper comprising a frame having side-sections whose opposite ends are pivoted and latched together respectively for enclosure of a tire, and a plurality of fingers having laterally disposed pricking points supported by said side-sections.

2. A contour-caliper comprising a frame having side-sections whose opposite ends are pivoted and latched together respectively for enclosure of a tire, and a plurality of fingers having laterally disposed pricking points, each of said fingers being adjustable universally in a plane substantially parallel to the frame and independently of the other fingers.

3. A contour-caliper comprising a frame having side-sections whose opposite ends are pivoted and latched together respectively for enclosure of a tire, and a plurality of fingers independently adjustable and having laterally disposed pricking points, means for frictionally supporting the fingers to facilitate endwise adjustment thereof, and means for positively clamping the fingers when adjusted.

4. A contour-caliper having a frame adapted to be positioned about a tire and having articulated sections in shape resembling the side walls of a tire, and means for holding the sections in fixed relation, each of said sections being provided with a slot, a plurality of pointed fingers, and means adjustable in the slot for separately clamping the fingers against the sections of the frame and to one side thereof.

5. A contour-caliper having a frame adapted to be positioned about a tire and having articulated sections, and means for holding the sections in fixed relation, each of said sections being provided with a slot, a plurality of fingers having lateral chisel-points, and means located entirely to one side of the plane of the several chisel-points for supporting said fingers so as to permit adjustment both transversely and about the surface of tire enclosed by the frame.

6. A contour-caliper having a frame adapted to be positioned about a tire and having articulated sections, and means for holding the sections in fixed relation, each of said sections being provided with a slot, a plurality of fingers having laterally disposed chisel-points, and means for adjustably supporting said fingers with the chisel-points wholly to one side of the contour-caliper, said last-named means including a bolt with a slotted end to slidably support a finger and with a shank through said slot, and a spring and nut for frictionally and positively clamping each finger against a side section as desired.

Signed at Detroit, Mich., this 25th day of November, 1921.

HECTOR V. LOUGH.